(12) United States Patent
Upadhyay et al.

(10) Patent No.: US 8,897,754 B1
(45) Date of Patent: Nov. 25, 2014

(54) ENSURING VOICEMAIL DELIVERY

(75) Inventors: Piyush Upadhyay, Overland Park, KS (US); Ayodeji Abidogun, Overland Park, KS (US); John W. Davis, Kansas City, MO (US); Badri P. Subramanyan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 713 days.

(21) Appl. No.: 12/689,363

(22) Filed: Jan. 19, 2010

(51) Int. Cl.
*H04M 11/00* (2006.01)

(52) U.S. Cl.
USPC .......................................................... 455/413

(58) Field of Classification Search
CPC ................................. H04W 4/12; H04W 28/14
USPC .................................... 455/412.1, 412.2, 413
See application file for complete search history.

(56) References Cited

U.S. PATENT DOCUMENTS

| | | | |
|---|---|---|---|
| 6,701,378 B1 * | 3/2004 | Gilhuly et al. | 709/249 |
| 7,383,304 B2 * | 6/2008 | Shimada et al. | 709/206 |
| 8,032,118 B1 * | 10/2011 | Othmer et al. | 455/412.1 |
| 2005/0181769 A1 * | 8/2005 | Kogawa | 455/413 |
| 2007/0082658 A1 * | 4/2007 | Tengler et al. | 455/413 |
| 2008/0167014 A1 * | 7/2008 | Novick et al. | 455/413 |
| 2009/0181641 A1 * | 7/2009 | Fiatal | 455/406 |

* cited by examiner

*Primary Examiner* — Olumide T Ajibade Akonai
*Assistant Examiner* — Shantell L Heiber (57) ABSTRACT

Methods and products for ensuring that incoming voicemails are stored on a voicemail server are provided. One embodiment of a method includes receiving an incoming voicemail that is to be stored in connection with a user account, determining that a threshold capacity of storage allocation associated with storing the voicemail has been crossed; identifying a mobile device associated with the user account, and moving a given amount of data from the storage location to the mobile device.

20 Claims, 7 Drawing Sheets

ENSURING VOICEMAIL DELIVERY

SUMMARY

Embodiments of our technology are defined by the claims below, not this summary. A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to facilitate ensuring that incoming voicemails intended for a given recipient are capable of being stored by a voicemail server.

BRIEF DESCRIPTION OF THE SEVERAL VIEWS OF THE DRAWINGS

Illustrative embodiments of the our technology are described in detail below with reference to the attached drawing figures, wherein.

DETAILED DESCRIPTION

The subject matter of the present technology is described with specificity herein to meet statutory requirements. However, the description itself is not intended to define the technology, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

| | |
|---|---|
| ASCII | American Standard Code for Information Interchange |
| CDMA | Code Division Multiple Access |
| GPRS | General Packet Radio Service |
| GSM | Global System for Mobile communications: originally from Groupe Spécial Mobile |
| IP | Internet Protocol |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary by H. Newton, 24th Edition (2008).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
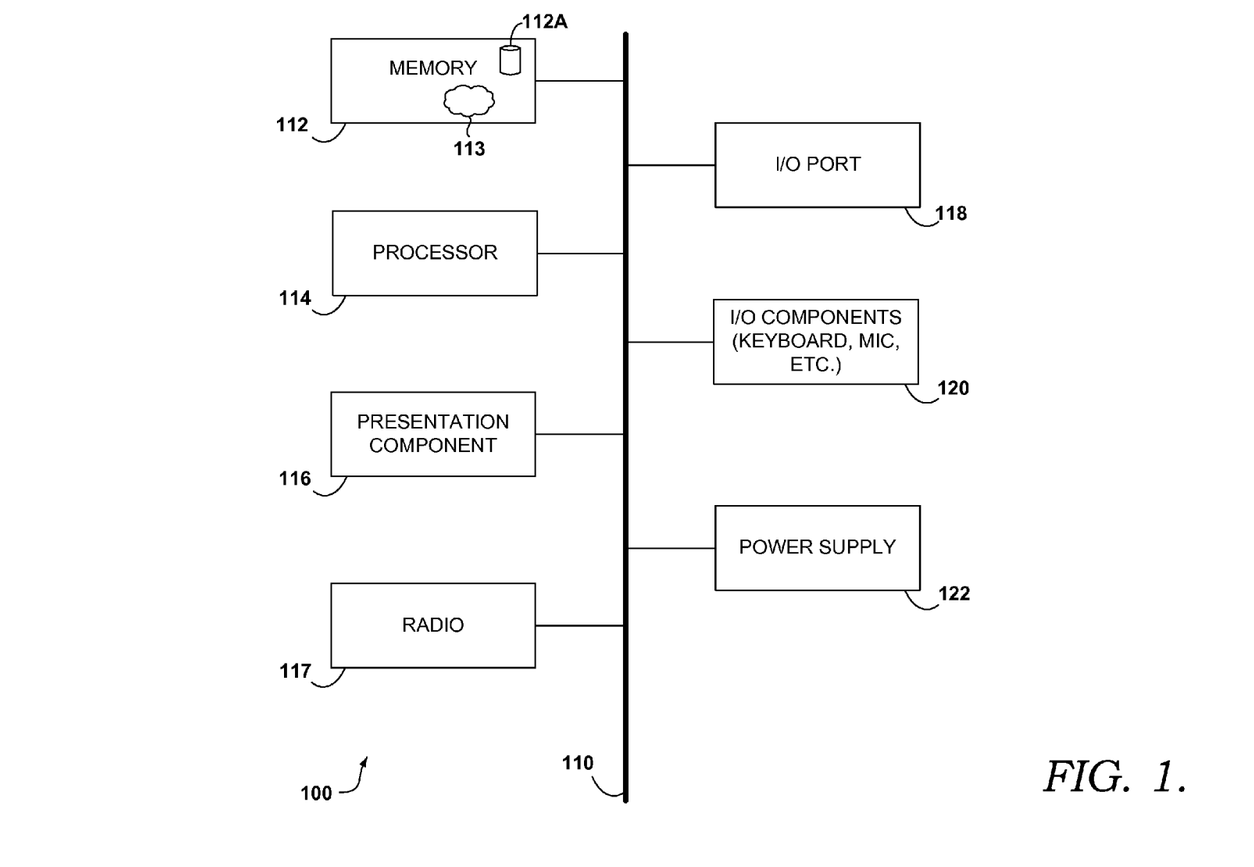
FIG. 1 depicts an illustrative device suitable for use in connection with an embodiment of our technology.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Thus, we will not elaborate more here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions 113" or "application 113" for short. In some embodiments, storage space 112A is useable to store, for example, voicemail data.

Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Figure 2:
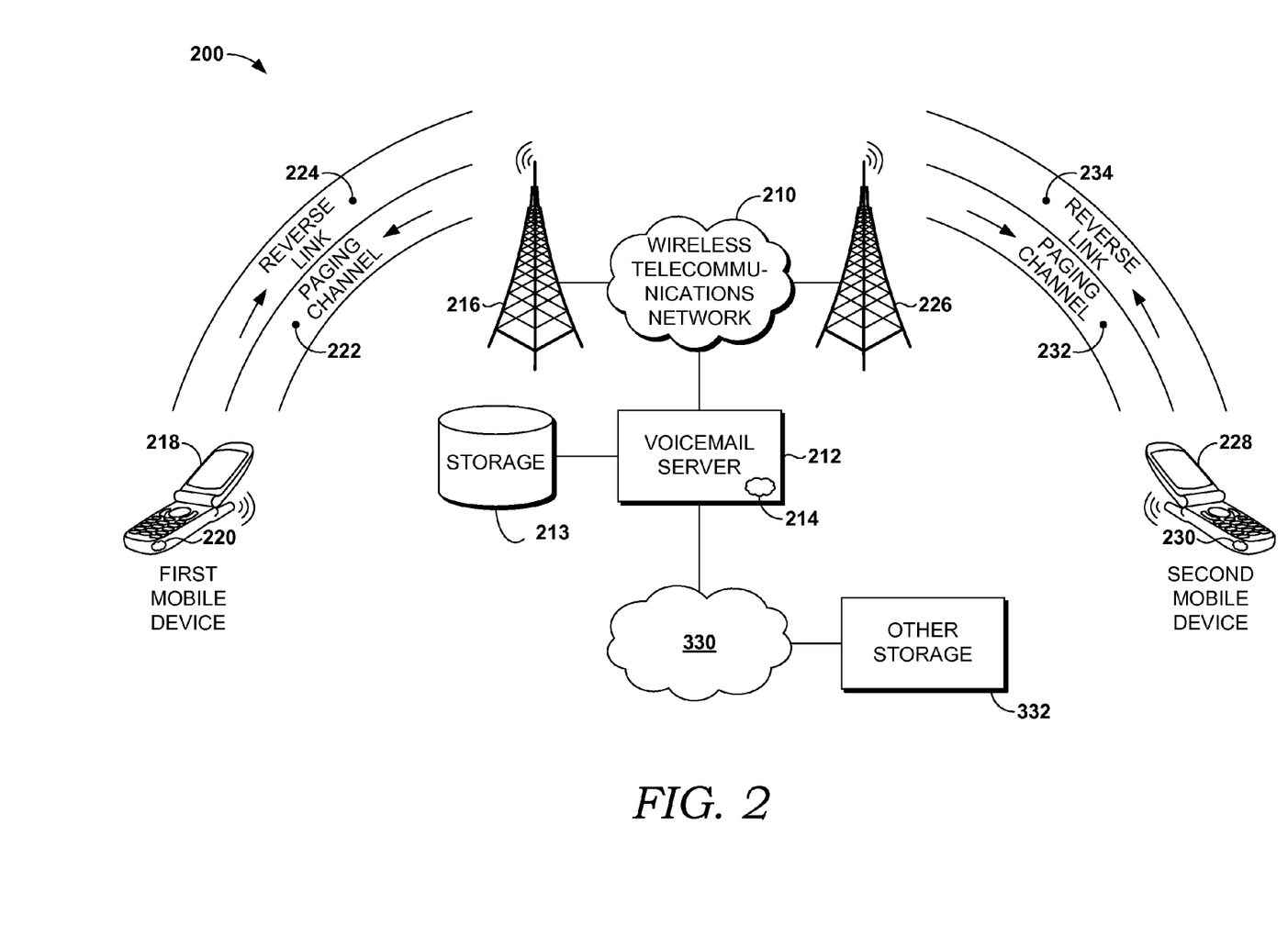
FIG. 2 depicts an illustrative operating environment suitable for practicing an embodiment of our technology.

Turning now to FIG. 2, an illustrative operating environment suitable for practicing an embodiment of our technology is provided and referenced generally by the numeral 200. Operating environment 200 includes a wireless telecommunications network 210. Wireless telecommunications network 210 is capable of communicating various technologies such as CDMA, GPRS, GSM, WiMAX, and the like.

In one embodiment, wireless telecommunications network 210 is coupled to a voicemail server 212. Voicemail server 212 can take on a variety of forms. For example, it might be a computer or set of computers. Voicemail server 212 is responsible for receiving and storing voicemail messages. In one embodiment, messages might be stored on voicemail server 212 itself, and in other embodiments voicemails might be stored in a storage device 213 that is coupled to voicemail server 212. Voicemail server 212 responds to requests for voicemails as well, so that people calling in to retrieve voicemail messages are able to do so. In one embodiment, a set of embodied computer-executable instructions 214 are stored in a memory component of voicemail server 212. The set of embodied computer-executable instructions 214 would be variously referred to as an "application" herein. Application 214 facilitates various functional aspects of our technology. For example, as will be described, it facilitates various functional features found in FIGS. 5-7.

Voicemail server 212 is coupled by way of wireless telecommunications network 210 (which might include portions of the Internet) to a first base transceiver station or tower 216. Base station 216 is capable of wirelessly communicating with a first mobile device 218, which includes a client application 220 that can also take the form of a set of embodied computer-executable instructions that are embodied on a memory component of first mobile device 218, which functionally can take the form of what was explained in connection with FIG. 1. First mobile device 218 also includes one or more memory components (such as 112) that are usable to store data locally. Illustrative mobile devices include PDAs, cell phones, blackberry (R)-type devices, and the like.

A paging channel 222 is usable to communicate information between base station 216 and first mobile device 218. For example, paging channel 222 can be used to transmit a paging signal from wireless telecommunications network 210 to first mobile device 218, which can respond by way of reverse link 224 to apprise network 210 of its status. Paging channel 222 is also usable to communicate other types of information to first mobile device 218.

Similarly, base station 226 can communicate with a second mobile device 228 by way of paging channel 232. Second mobile device 228 also includes a set of embodied computer-executable instructions 230 that facilitate various functional aspects of embodiments of the invention. Reverse link 234 is usable by a second computing device 228 to communicate data from second mobile device 228 to wireless telecommunications network 210 by way of base station 226. Thus, both first and second mobile devices 218 and 228 can communicate with voicemail server 212 by way of the infrastructure explained in FIG. 2.

Figure 3:
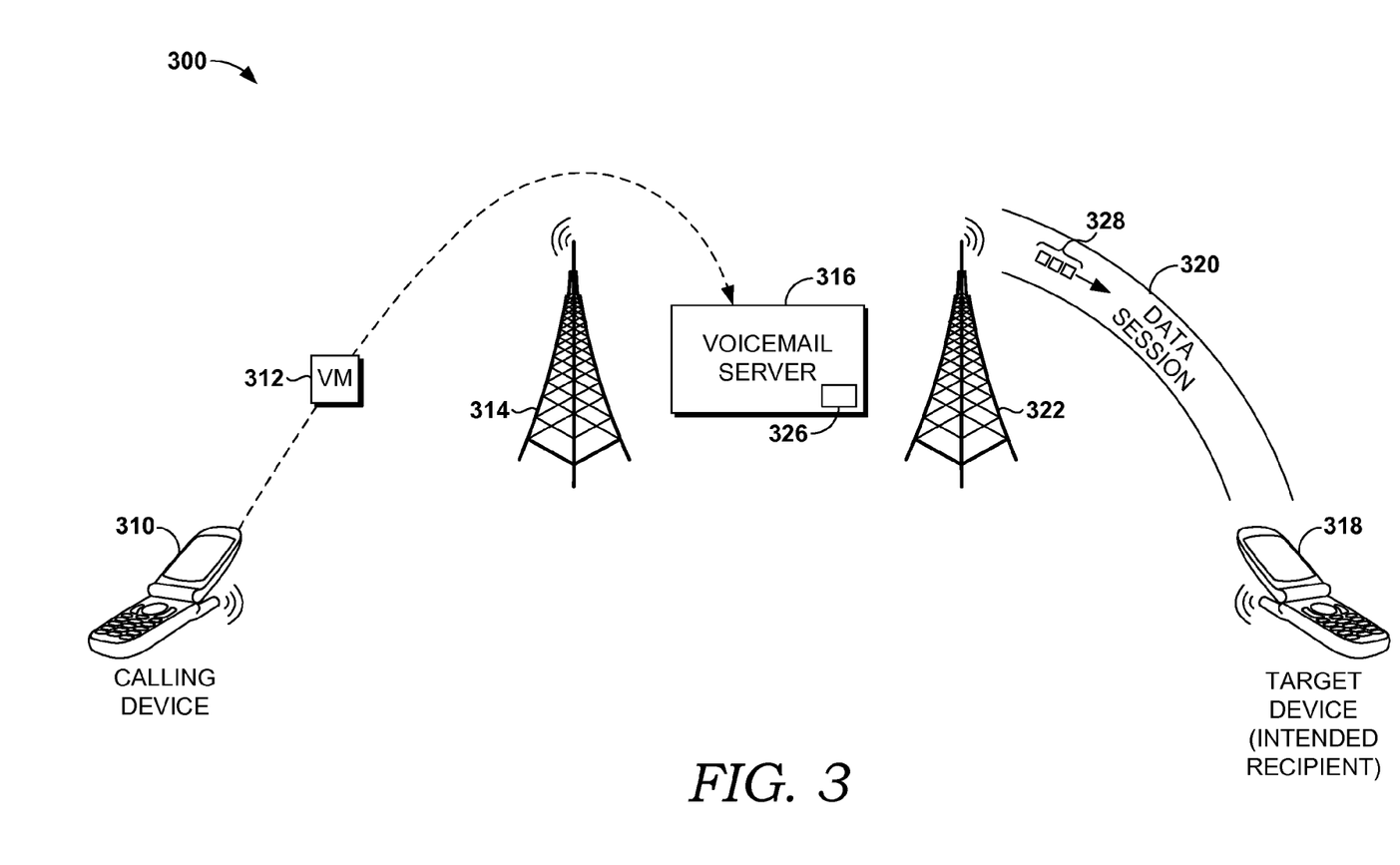
FIG. 3 depicts another illustrative operating environment that is suitable for practicing an embodiment of our technology.

Turning now to FIG. 3, another illustrative operating environment suitable for practicing an embodiment of the present invention is provided and referenced generally by the numeral 300. This embodiment includes a calling device 310 that is capable of communicating a voicemail message 312 to a voicemail server 316 by way of a base station 314. Voicemail server 316 can also communicate with a target device 318 by way of a data session 320. A data session is a session that is a communications session that is established between a mobile device and a remote component by way of a wireless telecommunications network (not shown so as to not obscure aspects of the present invention). Data session 320 can be comparatively higher bandwidth than paging channels 222 and 232. Common types of data that are communicated by way of data session 320 include e-mails, voice data, picture data, and the like. Data session 320 might be intermittent, temporary, or permanent. For example, if target device 318 were a device that commonly receives e-mail messages, then data session 320 would likely persist for an indefinite amount of time so that e-mails sent from a sender arrive at target device 318 within a very short time of being sent. Because a data session 320 is maintained, data can be communicated to target device 318 very quickly.

In one embodiment, voicemail server 316 stores voicemail data 326. As mentioned, voicemail data 326 might be stored in a storage device that is coupled to voicemail server 316. As will be explained, at least a portion 328 of voicemail data 326 can be communicated to target device 318 by way of data session 320.

These are two illustrative operating environments of many different types of operating environments. The two illustrative operating environments that we have just described are usable to facilitate a method for managing voicemails. Absent our technology, a user's voicemail mailbox might get filled up. That is, too many people might leave too many voicemails for a given user such that that user's voicemail mailbox reaches a maximum capacity and is then no longer capable of storing new voicemail messages. This is problematic because if a caller desires to attempt to reach the user and to leave a voicemail message, the caller will be unable to do so because the user's voicemail mailbox is not capable of storing voicemails.

Thus, our technology allows a way to preserve space on a mail server or other storage device where voicemails are stored so that whenever a given caller calls an intended recipient, that caller will be able to leave a voicemail message. Embodiments of our technology include offloading voicemail data from where the data is currently stored so as to maintain a certain threshold level of storage capacity. For example, implementation details might dictate that at least 5%, or 10%, or 15%, etc., of storage space must be maintained. If the amount of free space dips below this threshold amount, the data is offloaded from the primary storage space onto a secondary storage space, including the intended recipient's mobile device. Sometimes this data is communicated by way of a paging channel and other times the data is communicated by way of a different type of communications session such as a data session.

Figure 4:
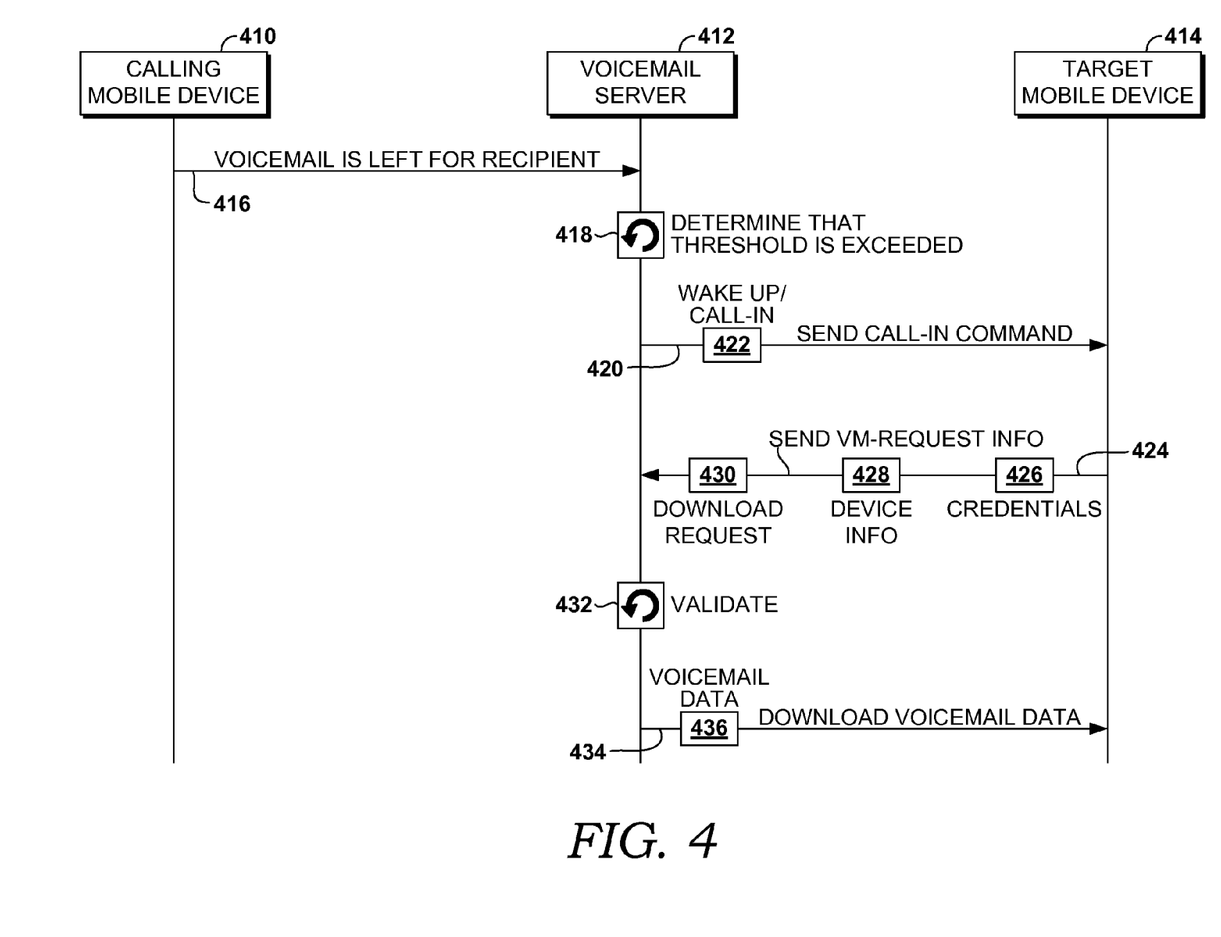
FIG. 4 depicts an illustrative data-flow diagram that depicts a first way of ensuring that incoming voicemails get stored according to an embodiment of our technology.

An illustrative method for managing voicemails is provided in FIG. 4, to which we now turn. FIG. 4 depicts a calling mobile device 410, a voicemail server 412, and a target mobile device 414. These devices are provided in unique reference numerals so as to make referencing to them easy, not necessarily to distinguish them from similar devices that we have previously described. Calling mobile device 410 and target mobile device 414 can be similar to calling device 310, and other types of calling devices we have discussed, including that described in connection with FIG. 1. Similarly, voicemail server 412 can be similar to voicemail server 212 and/or voicemail server 316. In one embodiment, a voicemail is left for an intended recipient at a step 416. Thus, when one user attempts to call a recipient, a voicemail is left for the recipient. Again, the voicemail might be stored on voicemail server 412 itself, or some other primary-storage media that voicemail server 412 is coupled to.

At a step 418, a determination is made that a stored-level threshold is exceeded. For example, assume that before a step 416 occurred, a user's voicemail mailbox was at 89%. Moreover, assume that at least 10% of storage space is to be maintained as free. Then, after the voicemail of step 416 is left, the amount of free space drops to 9%. In this example, a determination would be made at a step 418 that the threshold amount of data stored has been exceeded.

If this happens, then voicemail data can be moved from voicemail server 412 to a secondary storage space in a variety of ways. As will be explained, a paging channel could be used, a data session could be used, data can be pushed to the mobile device, or the mobile device can be utilized to, in a sense, pool information from voicemail server 412. We will describe this environment in the continuing example of FIG. 4. That is, FIG. 4 will continue by explaining an embodiment in which the target mobile device 414 calls into voicemail server 412 when it becomes able to communicate with wireless telecommunications network 210 (for example, when the phone is turned back on, or reaches a serviceable area).

At a step 420, a call-in command 422 is sent from voicemail server 412. In some embodiments, the voicemail server 412 does not actually send the command but initiates a request that such command be sent to target mobile device 414. This is a command that can wake up target mobile device 414 if it is asleep and have it initiate a series of steps. If the device 414 was previously out of range, and has come back into range, then by way of instructions such as 230 or 220, it will send voicemail-request information at a step 424 to voicemail server 412. In one embodiment, voicemail-request information includes one or more of a download request 430, device information 428, and/or security credentials 426. Download request 430 was a request to have voicemail information downloaded from voicemail server 412. The request could be for a fixed amount of data, such as so many kilobytes or megabytes. In other embodiments, it can be a variable amount such as a percentage of data. Device information 428 can include information about target mobile device 414. For example, illustrative types of device information might include an amount of storage capacity available on target mobile device 414. Other types of device information that might be included include an indication as to whether target mobile device 414 includes removable storage, or other information that is usable by voicemail server 412 to determine an amount of data to be offloaded from voicemail server 412. Security credentials 426 are usable to authenticate a download request; that is, that the request to download information is legitimate and properly came from the right device or at least from an authorized entity.

At a step 432, voicemail server 412 validates the download request 430. In some embodiments, voicemail server 412 itself does not actually validate security credentials 426. Another component might perform this validation step. In still other embodiments, the security inherent within a wireless telecommunications network can be used to authenticate the target mobile device 414, and then by way of the authentication enable data to be communicated to the specific target mobile device, especially if the device is associated with a user for whom the voicemail information is left. That is, if the user uses his or her own phone to check voicemail, then the fact that the user is using his or her own phone is sufficient in some embodiments to be able to receive voicemail data.

At a step 434, voicemail data 436 is downloaded to target mobile device 414. In one embodiment, a fixed amount of data is downloaded so that a desired amount of free space on voicemail server 412 is recovered. In other embodiments, voicemail server 412 makes a more intelligent choice and factors in all or a portion of device information 428 in order to determine how much data to download. For example, the voicemail-request information might include an indication that target mobile device 414 can take on 50 megabytes of storage of data to be stored. If this is the case, voicemail server 412 might opt to download a majority of voicemail data that is stored on voicemail server 412. Similarly, if the voicemail-request information indicates that target mobile device 414 can only store a small amount of data, then perhaps only a small amount of information will be communicated to target device 414.

Figure 5:
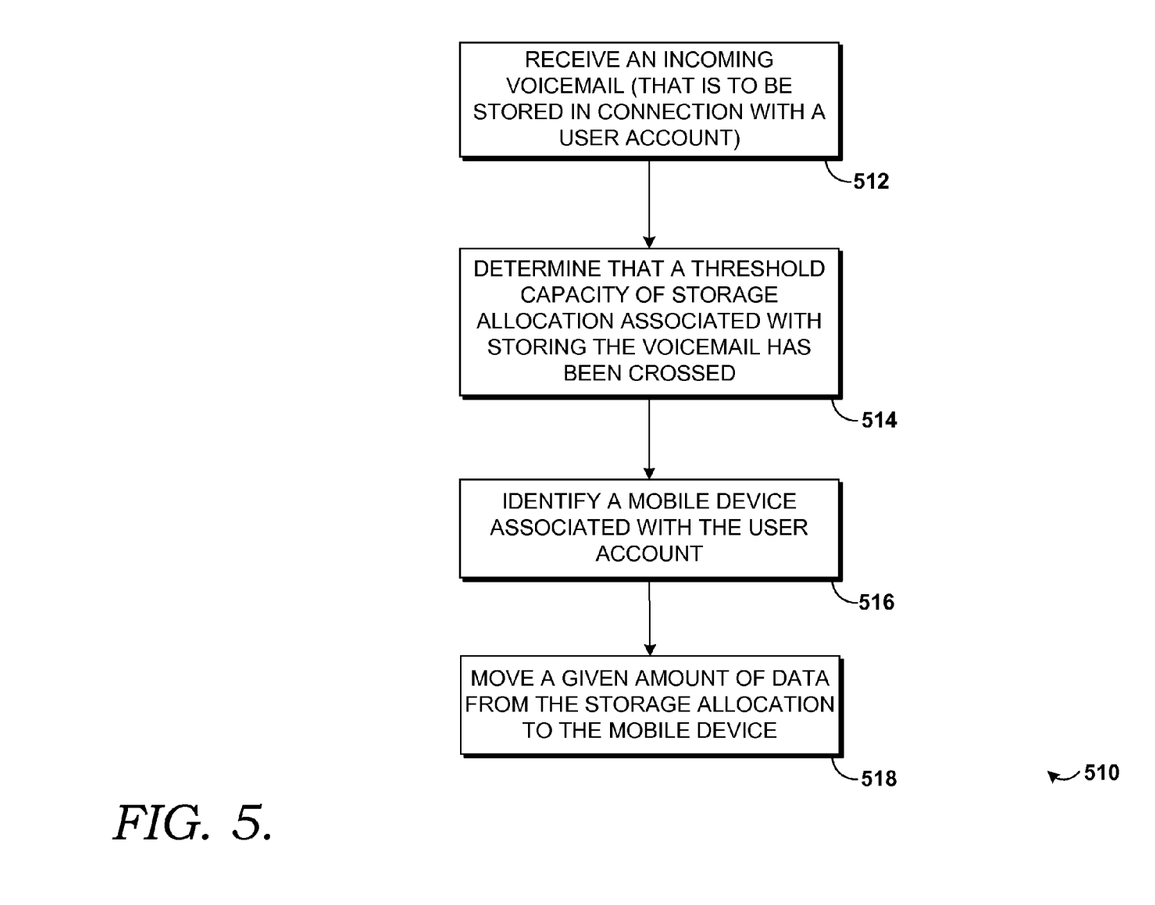
FIGS. 5-7 depict three other illustrative methods for ensuring that incoming voicemails get stored according to various embodiments of our technology.

Turning now to FIG. 5, another illustrative method of managing voicemails is provided and referenced generally by the numeral 510. We will make reference to FIGS. 2 and 3 in describing various aspects of the method described in FIG. 5. At a step 512, an incoming voicemail is received that is to be stored in connection with the user account. Thus, a voicemail server receives a voicemail that a caller has indicated is to be delivered to a certain user. In some embodiments, each user might be allocated a fixed amount of storage space, for example, so many megabytes. When an incoming voicemail is received, it is stored in connection with a specific user account.

At a step 514, a determination is made that a threshold storage capacity has been crossed. Application 214 can monitor the storage capacity of various users' mailboxes, and when the amount of data exceeds some threshold, it can initiate a process to move data from voicemail server 212 onto a secondary storage location.

At a step 516, a mobile device is identified that is associated with the intended recipient, that is the user account, is identified. One way of performing this is to reference a customer-profile's database that stores customer information. This customer information would map a given user or voicemail mailbox to a corresponding mobile device. Thus, a mobile-device identifier can be determined by referencing customer-profile information.

At a step 518, some of the voicemail data is moved from the primary storage location to the mobile device. As previously mentioned, this data can be moved by way of paging channel 232 or data session 320 as the case may be. Utilizing the paging channel includes sending portions of the amount of data to be sent while data can be communicated via the paging channel. The paging channel might not be persistently available based on operating conditions. Application 230 can monitor the data as it is communicated from voicemail server 212 so that when a sufficient amount of data is gathered to assemble voicemail messages, they are presented as available on a receiving mobile device such as second mobile device 228. In an alternative embodiment, such as that described in connection with FIG. 4, a data session can be established with the target mobile device and then used to communicate portions 328 of data until a desired amount has been sent.

Figure 6:
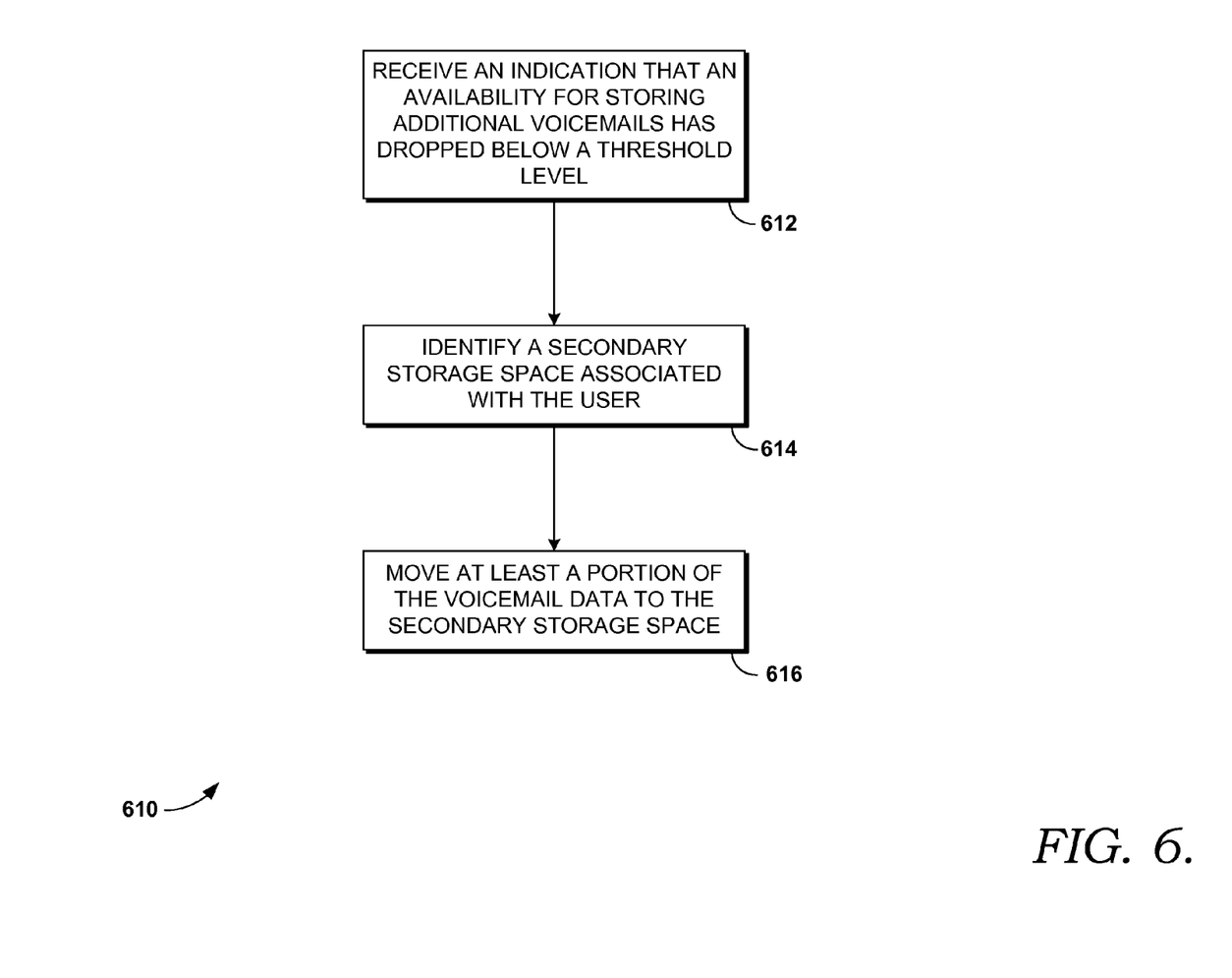

Turning now to FIG. 6, another illustrative method for ensuring that incoming voicemails get stored is provided and referenced generally by the numeral 610. At a step 612, an indication is received that indicates an availability for storing additional voicemails has dropped below some threshold level. The additional voicemails would be those that are intended for a given user. The threshold level would be based on a current amount of voicemail data that is stored in some storage location in connection with a given user in one embodiment. Thus, as previously explained, perhaps someone phones in and leaves a very long voicemail message for somebody. In that event, their leaving that voicemail might have caused a desired amount of free space to become consumed. This being the case, application 230 continues a process or initiates the same by identifying a secondary storage space that is associated with the user at a step 614.

By way of example, a secondary storage space might include storage space on a mobile device that is associated with the user for whom the voicemail is being left. As mentioned, this data can be gleaned from a customer-profile's database 213. The voicemail would have been stored at a first location, which is remote with respect to the secondary storage space.

At a step 616, some of the data that was stored on the voicemail server is moved to the secondary storage space, and thus free storage space rises above the desired threshold level on the remote voicemail server 212 (or other storage space 213 that is coupled to voicemail server 212).

Figure 7:
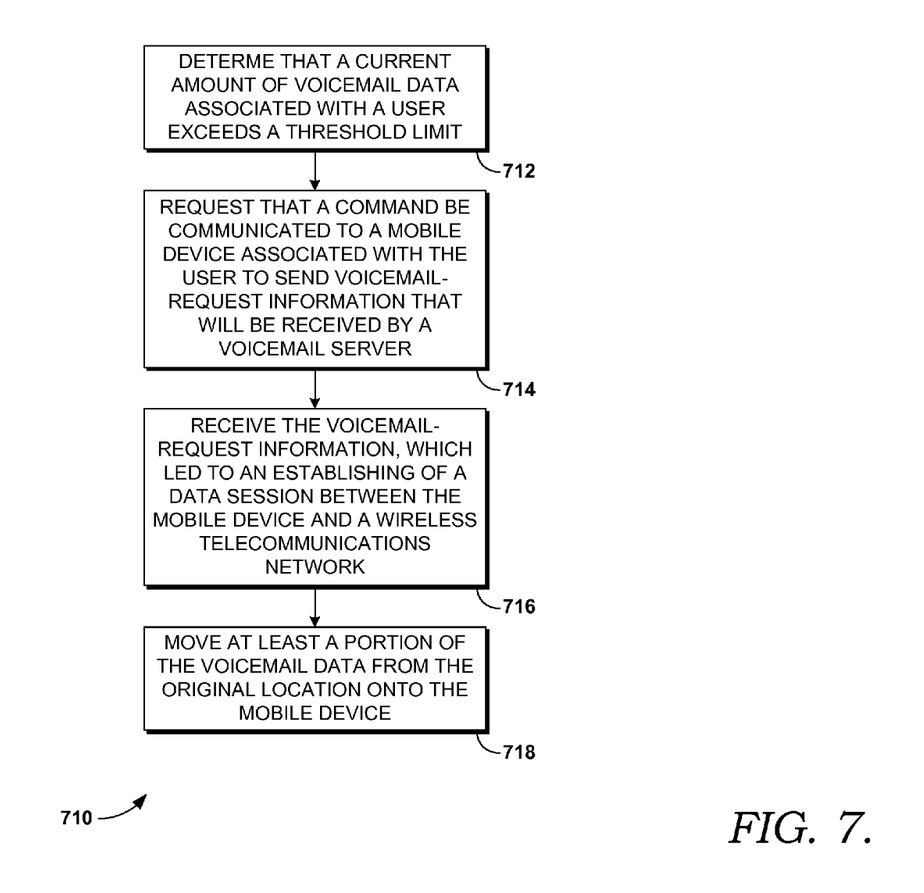

Turning now to FIG. 7, another illustrative method for ensuring that incoming voicemails get stored is provided and referenced generally by the numeral 710. In this embodiment, a determination is made at a step 712 that a current amount of voicemail data that is associated with the user exceeds a threshold limit. At a step 714, the voicemail server 212 requests that a command be sent to the user's mobile device that will cause the mobile device to send voicemail-request information such as that described in FIG. 4. This command would instigate a mobile device to send voicemail-request information that would ultimately be received by a voicemail server if needed.

At a step 716, the voicemail-request information is received. By way of receiving the voicemail-request information, in one embodiment, a mobile device will have established a data session between itself and a wireless telecommunications network that is associated with the voicemail server. In this way, that data session is usable at a step 718 to move some of the voicemail data off the first storage device onto the mobile device.

Other user storage space 332 (e.g., separate or as part of a PC for example) can be used to store offloaded data, sent thru the Internet 330 if desired.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. Non-transitory computer-readable media having computer-executable instructions embodied thereon that, when executed, facilitate a method of ensuring that incoming voicemails get stored on a voicemail server, the method comprising:
   receiving an incoming voicemail that is to be stored in connection with a user account;
   determining that a threshold capacity of storage allocation associated with storing the voicemail has been crossed;
   identifying a mobile device associated with the user account;
   generating a request for voicemail-request information, wherein the request triggers a call-in command to set up a data communication session between the mobile device and wireless communications network for moving the voicemail data off a storage allocation onto the mobile device;
   upon generating the request, receiving the voicemail-request information, which, having been sent from the mobile device, led to an establishing of the data session between the mobile device and a wireless telecommunications network associated with the storage allocation, wherein the voicemail-request information comprises at least in part mobile device information including storage information;
   moving a given amount of data from the storage allocation to the mobile device, wherein the given amount of data is stored in the local storage of the mobile device; and
   upon moving the given amount of data from the storage allocation to the mobile device, recovering the given amount of data storage space as free space on the storage allocation.

2. The computer-readable media of claim 1, wherein the incoming voicemail is received by a server that is configured to facilitate reception and storage of the incoming voicemail.

3. The computer-readable media of claim 2, wherein the storage allocation is one or more of
   a storage device coupled to the server; or
   the server.

4. The computer-readable media of claim 3, wherein identifying the mobile device includes:
   referencing a customer profile associated with the user account; and
   determining from the customer profile a mobile-device identifier that is useable to identify the mobile device.

5. The computer-readable media of claim 3, wherein moving the amount of data is carried out by utilizing a communications pathway that is useable to communicate data between a wireless telecommunications network and the mobile device, wherein the communications pathway includes one or more of the following:
   a paging channel; or
   a data session.

6. The computer-readable media of claim 5, wherein the utilizing the paging channel includes, while data can be communicated via the paging channel, sending portions of the given amount of data through the paging channel until the given amount of data is communicated to the mobile device.

7. The computer-readable media of claim 6, wherein the utilizing a communications session includes:
   requesting that a call-in command be sent to the mobile device, wherein the call-in command is useable by the mobile device to establish a communications session with the voicemail sever;
   receiving a request from the mobile device to receive at least a portion of the given amount of data; and
   via the communications session, sending to the mobile device the at least a portion of the given amount of data.

8. The computer-readable media of claim 7, wherein the utilizing the communications session further includes receiving one of the following:
   storage-availability information from the mobile device; or
   device information that describes the mobile device.

9. The computer-readable media of claim 8, wherein one or more of the storage-availability information or the device information is considered prior to sending the at least a portion of the given amount of data.

10. The computer-readable media of claim 9, wherein the storage-availability information indicates an amount of available storage space that is available on the mobile device to store the given amount of data.

11. The computer-readable media of claim 10, wherein the device information includes storage capabilities of the mobile device.

12. Non-transitory computer-readable media having computer-executable instructions embodied thereon that facilitate a method of ensuring that incoming voicemails get stored on a voicemail server, the method comprising:
- receiving an indication that an availability for storing additional voicemails has dropped below a threshold level based on a current amount of voicemail data that is stored in a first storage location in connection with a user;
- identifying a secondary storage space associated with the user;
- generating a request that a call-in command be sent to the secondary storage location, wherein the call-in command is useable by the secondary storage location to establish a communications session with the voicemail server associated with the first storage location;
- receiving a request from the secondary storage location to receive at least a portion of the voicemail data;
- via the communications session, moving to the secondary storage space the portion of the voicemail data; and
- upon moving to the secondary storage space the portion of the voicemail data, recovering the portion of voicemail data storage space as free space on the first storage location.

13. The computer-readable media of claim 12, wherein
- the first storage location is remote with respect to the second storage space; and
- the first storage location is coupled to the voicemail server.

14. The computer-readable media of claim 13, wherein the secondary storage space is a wireless mobile device.

15. The computer-readable media of claim 14, wherein the moving includes utilizing a wireless communications network to communicate the portion of the voicemail data to the mobile device.

16. Non-transitory computer-readable media having computer-executable instructions embodied thereon that facilitate a method of ensuring that incoming voicemails get stored on a voicemail server, the method comprising:
- determining that a current amount of voicemail data associated with a user exceeds a threshold limit, wherein the voicemail data is stored in a first storage device;
- generating a request at the voicemail server that a command be communicated to a mobile device associated with the user; wherein the command would instigate the mobile device to send voicemail-request information that would ultimately be received by the voicemail server, wherein the request at least triggers a call-in command to set up a data session between the mobile device and wireless communications network for moving the voicemail data off the first storage device onto the mobile device;
- upon generating the request, receiving at the voicemail server the voicemail-request information, which, having been sent from the mobile device, led to an establishing of the data session between the mobile device and a wireless telecommunications network associated with the voicemail server; wherein the voicemail-request information comprises at least in part mobile device information including storage information;
- moving a portion of the voicemail data off the first storage device onto the mobile device by way of the data session; and
- upon moving the portion of the voicemail data off the first storage device onto the mobile device, recovering the voicemail data storage space as free space on the first storage device.

17. The computer-readable media of claim 16, wherein the voicemail-request information includes one or more of the following:
- a download request; or
- voicemail log-in credentials.

18. The computer-readable media of claim 17, wherein said portion of the voicemail data is a fixed amount.

19. The computer-readable media of claim 17, wherein said portion of the voicemail data is a percentage amount.

20. The computer-readable media of claim 17, wherein said portion of voicemail data is determined, at least in part, based on a capacity of device-storage available on the mobile device.

* * * * *